March 19, 1963 R. E. FEUCHT ETAL Re. 25,356

MANUAL CONTROL SYSTEM FOR MODIFYING OR OVERCOMING THE AUTO PILOT CONTROL

Original Filed March 4, 1955 3 Sheets-Sheet 1

INVENTORS
ROBERT E. FEUCHT
JOHN JARVIS
JOHN C. ZIEGLER

BY Herbert L. Davis
ATTORNEY

INVENTORS
ROBERT E. FEUCHT
JOHN JARVIS
JOHN C. ZIEGLER
BY Herbert L. Davis
ATTORNEY INVENTORS
ROBERT E. FEUCHT
JOHN JARVIS
JOHN C. ZIEGLER
BY Herbert L. Davis
ATTORNEY United States Patent Office Re. 25,356
Reissued Mar. 19, 1963

25,356

MANUAL CONTROL SYSTEM FOR MODIFYING OR OVERCOMING THE AUTO PILOT CONTROL

Robert E. Feucht, North Bergen, John Jarvis, Merchantville, and John C. Ziegler, Maywood, N.J., assignors to the Bendix Corporation, a corporation of Delaware Original No. 2,861,756, dated Nov. 25, 1958, Ser. No. 492,168, Mar. 4, 1955. Application for reissue Sept. 18, 1959, Ser. No. 840,987
9 Claims. (Cl. 244—83)

Matter enclosed in heavy brackets [ ] appears in the original patent but forms no part of this reissue specification; matter printed in italics indicates the additions made by reissue.

This invention relates generally to control systems and more particularly to an arrangement for imparting to a control system a control action proportional to a force exerted on a control column.

An automatic control system for an aircraft stabilizes the craft by detecting deviation of the craft from a predetermined condition and applying the required corrective effect on the appropriate control surface of the craft. The detectors are so sensitive and the control effect is applied to the surfaces with such rapidity that the condition of the craft is controlled far more precisely by the automatic control system than could be achieved manually.

An automatic control system, however, is complex and complicated; and the possibility exists that a component may fail and the craft be placed in a dangerous attitude before the condition can be corrected. Some systems, therefore, restrict the maximum effort that the control system servomotor can exert on the control surface to a value low enough that the human pilot can operate the control surface by the conventional manual control column in the craft against the opposition of the servomotor should the need arise. Other systems include a provision whereby the application of a predetermined force to the manual control column renders the automatic control system ineffective on the power means of the system so that the power means is thereafter operated under the commands of the human pilot.

An object of the present invention is to provide a novel arrangement whereby an application to the manual control column of a force less than that required to overcome the control system modifies the operation of the control system in proportion to this force.

Another object is to provide a novel means for developing a control signal proportional to the force exerted on a control column.

A further object is to provide a novel means for transforming the force exerted on a control member to a corresponding electrical impulse.

The present invention contemplates a novel automatic pilot system wherein the human pilot may, by the exerting of a force greater than a predetermined limit on the conventional manual controller, operate a control surface of a craft in opposition to the operation of the surface by the automatic pilot system and, by the exertion of forces less than that limit, develop control effects corresponding to the exertion to modify the operation of the automatic pilot system; such control effects, however, corresponding only to exertion sustained for a predetermined interval of time.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for the purpose of illustration and description only, and are not intended as definitions of the limits of the invention.

In the drawings wherein like parts are marked alike:

Figure 1:
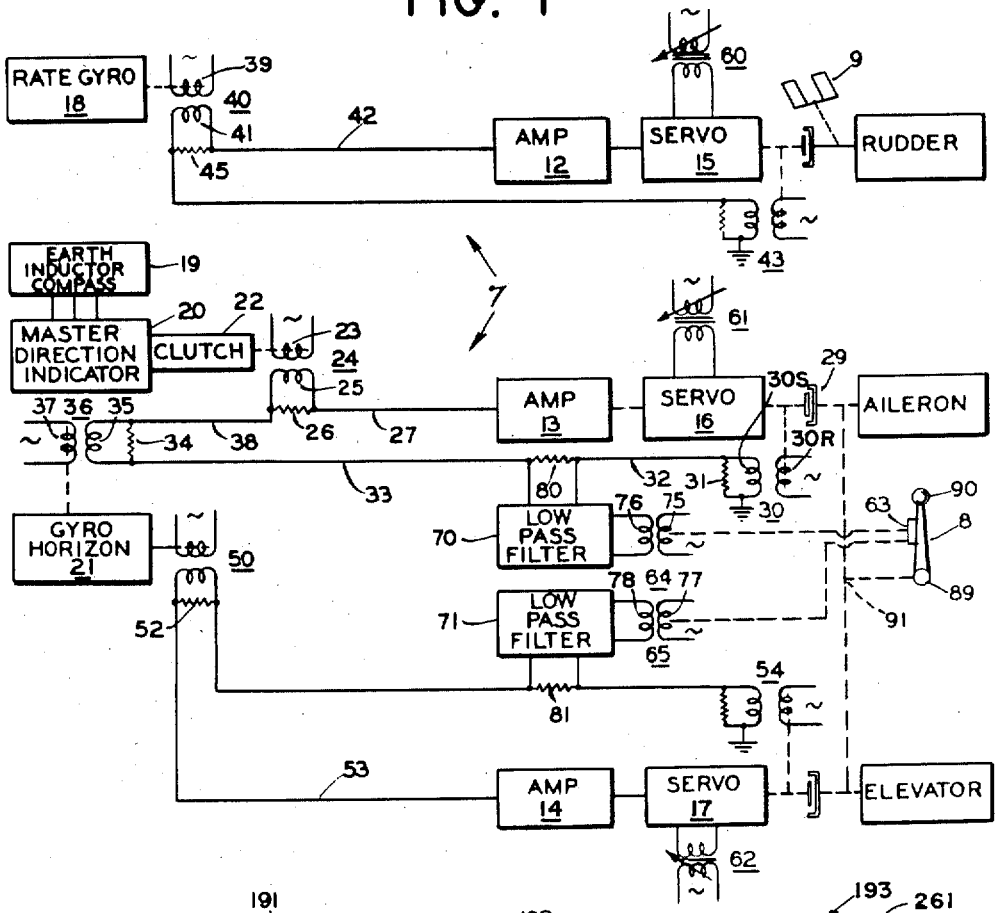
FIGURE 1 illustrates schematically an embodiment of the novel control system of the present invention wherein electric motors are utilized.

In FIGURE 1 is shown schematically an arrangement whereby the control surfaces of a craft may be operated automatically by an automatic control system denoted generally at 7 or directly manually by a conventional manual control column 8 and rudder pedals 9. The automatic pilot system comprises generally rudder, aileron and elevator channel amplifiers 12, 13 and 14, rudder, aileron and elevator servomotors 15, 16 and 17, a rate of turn gyro 18, an earth inductor compass 19 with a master direction indicator 20, and an artificial horizon 21. The manual control column 8 is mounted universally so that lateral displacements control the ailerons and longitudinal displacements control the elevators.

The direction displacement or heading signal developed by compass 19 is transmitted in a well known manner to a receiver inductive device in master direction indicator 20 wherein a motor is energized in accordance with the signal to drive the receiver to a null. When clutch 22 is engaged the motor also displaces the rotor winding 23 of an inductive device 24 relative to a stator 25 to develop across a resistor 26 a signal corresponding to the change in heading from that heading at which clutch 22 was engaged. Master direction indicator 20 is described more in detail in U.S. Patent No. 2,625,348, issued January 13, 1953.

The signal from resistor 26 is transmitted by lead 27 to the input of the aileron channel amplifier 13 whose output operates aileron servomotor 16. If clutch 29 be engaged, the operation of motor 16 moves the aileron surfaces. Motor 16 also displaces rotor 30R relative to stator 30S to develop a follow-up signal at inductive device 30, the follow-up signal being normally in opposition to the displacement signal.

Resistor 31 across the stator of inductive device 30 has one end grounded and the other end connected by leads 32 and 33 to resistor 34 connected across the stator 35 of inductive device 36 on the bank axis of the artificial horizon 21. Inductive device 36 is connected in a well known manner to the artificial horizon 21 so that relative displacement of the rotor 37 and stator 35 occurs upon a banking of the craft. Thus, any departure of the craft from a desired course which causes the craft to bank in the direction of the turn will develop a signal at inductive device 36 and this signal will be applied by lead 38 to resistor 26 and to motor 16 as described above.

The banking of the craft causes the craft to turn and develop a rate of turn about the yaw axis. In response, the rate gyro 18 actuates the rotor 39 of inductive device 40 to develop a signal at stator 41 which is applied by lead 42 to the rudder channel amplifier 12 whose output operates the servomotor 15 to displace the rudder surfaces. Follow-up inductive device 43 is provided so that the extent of displacement of the surface will correspond to the amplitude of the signal at resistor 45.

Any displacement of the craft in pitch [form] *from* a predetermined pitch attitude is recognized by inductive device 50 on the pitch axis of the artificial horizon 21, and a corresponding signal is developed across resistor 52. This signal, applied by lead 53 to the elevator channel amplifier 14, operates servomotor 17 to displace the elevator surfaces. Follow-up inductive device 54 is provided so that the surface displacement corresponds to the amplitude of the signal.

The servomotors 15, 16 and 17 are conventional inductive motors, each having two field windings; a variable phase winding energized by the output of the channel amplifier, and a fixed phase winding continually energized by a suitable source of alternating current. The torque exerted by the servomotor on the surface is limited by the provision of differential transformers 60, 61 and 62 to limit the excitation of the fixed phase winding, so that the human pilot by actuation of the manual control column 8 can move the surfaces.

The foregoing automatic pilot system is described more fully in the aforementioned Patent No. 2,625,348 issued January 13, 1952, as modified in accordance with the teaching of Patent No. 2,636,698 issued April 28, 1953.

In accordance with the present invention, novel force translation means are included in the signal chain so that, by applying to manual steering column 8 a force less than that required to overcome the operation of the elevator or aileron servomotors, and a signal proportional to this force is developed at either inductive device 64 or 65 depending upon the direction of application of the force; sensor 63 measuring the force. The signal is applied to either of a pair of low pass filters 70 or 71 which are provided so that the inertia of the pilot's hand and the spring rate or the stick will not form an oscillating system in actuating the automatic pilot system.

In a manner hereinafter described, the application of a force to control column 8 in a lateral direction will displace rotor 75 relative to stator 76 to develop a signal corresponding to the force. Similarly, the application of a force in a fore and aft or longitudinal direction will displace rotor 77 relative to stator 78 to develop a corresponding signal. After these signals have been present a length of time determined by the time constants of filters 70 and 71, these signals will be applied across resistor 80 or 81 into the aileron or elevator signal chain.

Should the automatic pilot system be controlling the [chaft] *craft* and the human pilot desire to change the bank attitude of the craft, he exerts a force on control column 8 in an attempt to move the stick in the required direction to bank the craft, the force exerted, however, being less than that required to overcome the torque of motor 16. The signal from inductive device 64 is applied through filter 70 to the resistor 80 in the signal chain. This signal transmitted to amplifier 13 operates servomotor 16 to displace the ailerons until the signal from follow-up device 30 is equal and opposite to the signal applied across potentiometer 80; the net signal to amplifier 13 is zero, and servomotor 16 stops. As the displaced surface places the craft in a banked attitude, an attitude signal develops at inductive device 36 equal and opposite to the signal from resistor 80. Follow-up device 30 then returns the ailerons to their initial position. In a similar manner, the signal across resistor 81 resulting from inductive device 65 operates servomotor 17 to place the craft in a pitch attitude other than the normal pitch attitude.

Figure 2:
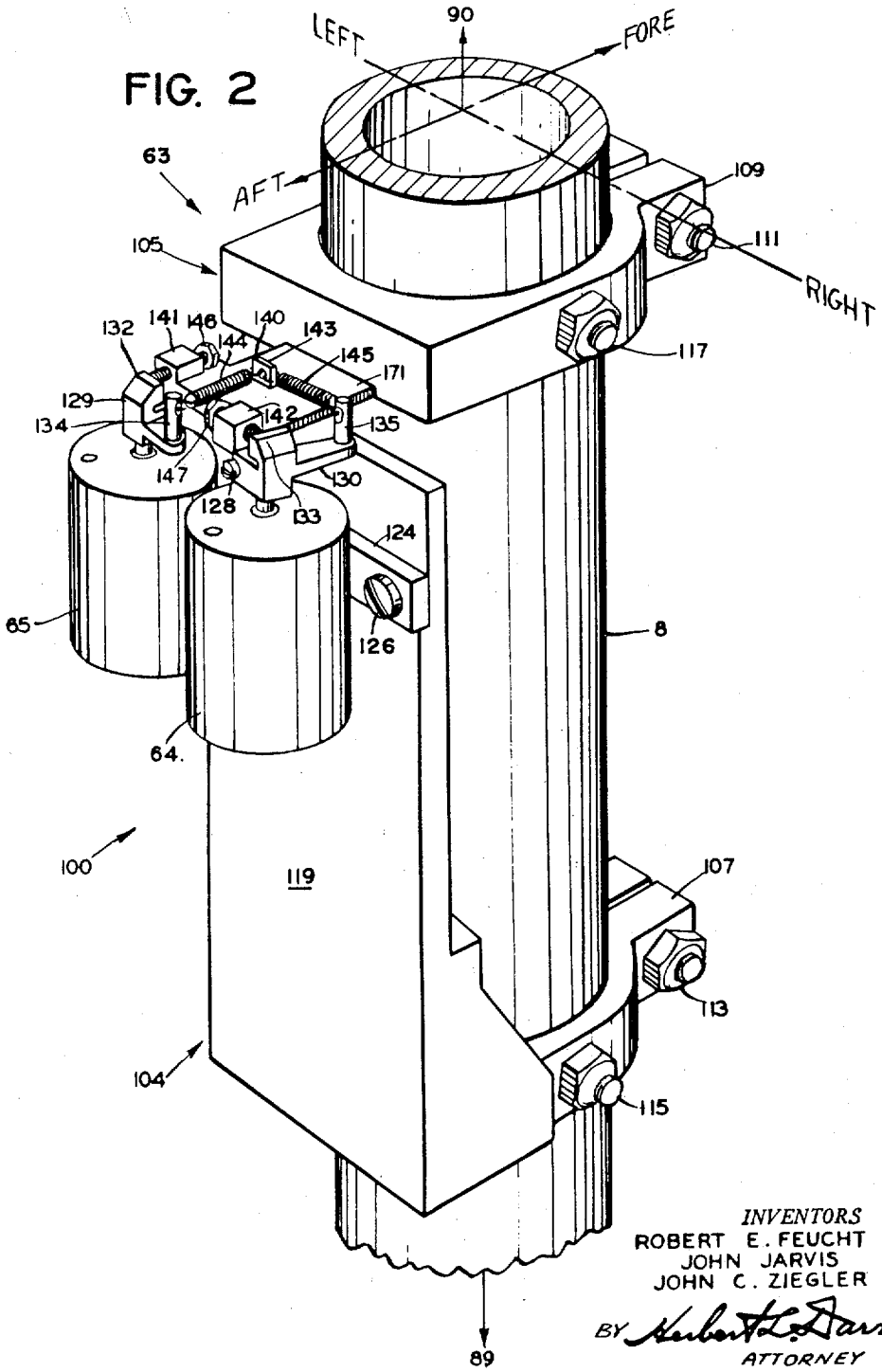
FIGURE 2 is an exaggerated view showing details of the novel force responsive arrangement shown in FIGURE 1.

Turning now to FIGURE 2, an operative embodiment of force measuring unit 63 is illustrated in detail. As described before, column 8 is universally mounted at the lower end 89 by conventional means (not shown) and forces exerted on a hand grip 90 at the top are transmitted through conventional mechanical linkages 91 to directly operate the aileron and/or elevator surfaces of a craft. The column 8 is formed of a suitable resilient material so that the application of those forces to the hand grip 90 at the top of column 8 cause a deflection of the column between this point and the bottom where the column is connected by linkages to the surfaces. These deflections are measured by a novel translating unit 100 and translated into proportional [eelctrical] *electrical* signals for the ailerons and elevators.

The translating unit includes two relatively movable sections 104 and 105 spaced along column 8. Section 104 is secured near the bottom of the column, and section 105 is secured near the top by respective clamp arrangements 107 and 109. Each clamp has its bifurcated ends clamped around column 8 by bolts 111 or 113 and has an intermediate portion pinned to the column by [blots] *bolts* 115 or 117.

Section 104 includes a base 119 which extends longitudinally of the column and carries the two inductive devices 64 and 65 whose housings are fastened to a member 124 which is suitably fixed to base 119 as by bolts 126. The stator units of these inductive devices are secured to the housings and rotor units are rotatable in the housings. Fixed to the shaft of each rotor as by bolts are brackets 129 and 130. Each bracket includes an abutment 132 or 133, and a pin 134 or 135. The abutment and pin are eccentric [wtih] *with* respect to the axis of the rotor shaft.

Section 105 includes a projecting base 140 having upright portions 141, 142 and 143. Tension springs 144 and 145 connect upright 143 and pins 134 and 135, respectively, and urge brackets 129 and 130 to rotate about their respective rotor shafts in a counter-clockwise direction. However, screws 146 and 147 threaded in uprights 141 and 142 engage abutments 132 and 133, respectively, at a point intermediate the axis of the bracket rotor shaft and bracket pin so as to limit rotation of the respective shafts in the counter-clockwise direction.

Although the automatic pilot system is operating the craft in the manner previously described, the human pilot may desire to change the pitch attitude. Accordingly, he applies a force to controller in an attempt to move the controller in fore or aft direction; the force, however, being less than required to override the automatic pilot system. The application of this force in a rearwardly or aft direction deflects the top of column 8 rearwardly relative to the bottom, and section 105 is deflected rearwardly relative to section 104. Since screw 146 is initially engaged with abutment 132 at a point intermediate the axis of the bracket rotor shaft and the pin 134, the rearward movement of section 105 relative to section 104 rotates bracket 129 about the axis of the shaft of rotor 77 in a clockwise direction. Conversely, the application of a force in a forwardly or fore direction deflects column 8 forwardly so that screw 146 tends to move away from the abutment 132. Spring 144, however, constrains bracket 129 to follow the screw, and the bracket rotates about the axis of the rotor shaft in a counter-clockwise direction. Since the bracket is fixed to the rotor shaft in each case, rotor 77 is displaced relative to stator 78 to develop a corresponding signal. The above deflections of the control column also moves screw 142 longitudinally relative to the face of abutment 133. This movement, however, is parallel to the face of the abutment, so no rotation of the rotor shaft of inductive device 64 occurs. In a similar manner, lateral deflection of column 8 to the left or right correspondingly rotates the rotor 75 of inductive device 64 in a counterclockwise or clockwise direction, respectively, relative to stator 76 to develop a signal for the roll or aileron channel.

Low pass filters 70 and 71 are inserted between the output of inductive devices 64 and 65 and resistors 80 and 81 in the signal chain to prevent the inertia of the human pilot's hand from operating the control surfaces. These filters may be identical so only one is described in detail.

Figure 3:
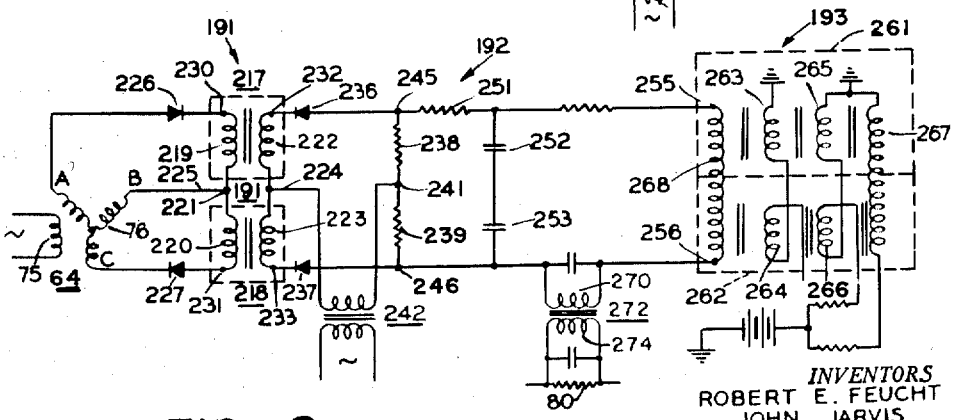
FIGURE 3 illustrates schematically the low pass filter illustrated in block diagram in FIGURE 1.

Turning now to FIGURE 3, filter 70 comprises a demodulator network 191, on RC delay network 192, and a modulator network 193. Inductive device 64 supplies the control signal to the filter and comprises a single phase wound rotor 75 which can be rotated relative to a three-phase Y-connected wound stator 76. Since rotor 75 is energized by a source of alternating current, three distinct voltages are induced to the stator winding, one in each leg. The turning of rotor 75 with respect to stator 76 changes the voltages induced in each leg of the stator; the sum of these three voltages, however, remain constant. Rotor 75 is normally positioned so that the voltage across legs A and C is the sum of the voltage across legs A and C and the voltage across legs B and C of demodulator 191.

Demodulator 191 may comprise two saturable transformers 217 and 218 whose primary windings 219 and 220 are connected to a common junction 221 and whose secondary windings 222 and 223 are connected to a common junction 224. One leg B of stator 76 is connected by lead 225 to junction 221, and the other two legs A and C are connected through rectifiers 226 and 227 to respective end terminals 230 and 231 of primary windings 219 and 220. Rectifiers 226 and 227 are connected with their polarities in opposed relationship. The end terminals 232 and 233 of secondary windings 222 and 223 are connected together through rectifiers 236 and 237, and resistors 238 and 239. The common junction 224 of secondary windings 222 and 223 and the common junction 241 of resistors 238 and 239 are connected across a suitable source of alternating current supplied by way of transformer 242.

The excitation across terminals 232 and 224 is so arranged with respect to the excitation across terminals 230 and 221 that rectifiers 226 and 236 conduct on opposite half cycles. In the half cycle during which rectifier 236 is conductive, the direct current impulse applied through the rectifier and winding 222 is sufficient to bring the core of transformer 217 to saturation at the quarter cycle and, during the following quarter cycle, the full value of the voltage is transmitted through rectifier 236. In the following half cycle the impulse applied across diode 226 is sufficient to reduce the saturation of the core to the original zero point. The same operation takes place at transformer 218. Thus, equal and opposite impulses are applied across resistors 238 and 239; and the net voltage is zero.

Upon displacement of rotor 75 relative to stator 76, the voltage in each of the three legs of stator 76 is changed. Depending upon the direction of this displacement, a greater impulse will be applied through one rectifier 226 or 227 and a lesser impulse through the other. The transformer having the greater impulse will be reset to a lower saturation level, and the one having the lesser impulse will be reset to a higher saturation level. On the next half cycle, the transformer which has been reset to the higher saturation level will become saturated before the quarter cycle is reached; and the full voltage will be passed through its rectifier for a longer period of time than the normal quarter cycle. On the other hand, the transformer which has been reset to a lower saturation level will require a longer period than a normal quarter cycle to reach saturation, and a lesser voltage will be applied through its rectifier. The normally balanced condition existing at terminals 245 and 246 will be destroyed and a differential voltage will be applied across the network 192 comprising resistor 251 and capacitors 252 and 253.

As is well known, network 192 will delay the appearance of this differential voltage across terminals 255 and 256 of the modulator 193 for a period of time determined by the time constant of this network.

Modulator 193 develops an alternating current signal corresponding in amplitude and phase to the magnitude and sense of the differential voltage across terminals 255 and 256. This modulator comprises generally two toroidal cores 261 and 262, each having four windings: primary windings 263 and 264 excited from a suitable source of alternating current, bias windings 265 and 266 excited from a suitable direct current source, balance winding 267 excited from the suitable direct current source, and control and output winding 268 connected across terminals 255 and 256. The primary windings and bias windings are connected in series opposition.

Normally, toroidal cores 261 and 262 are saturated to the same extent; equal and opposite voltages are induced in the control windings by the primary windings; and no net voltage develops across terminals 255 and 256. However, the appearance of a direct current voltage across these terminals causes a direct current to flow through the control windings. The resulting flux adds to the direct current flux provided by one bias winding and subtracts from the direct current flux provided by the other bias winding. As a result, the cores are no longer saturated alike, and a differential alternating current voltage is developed across terminals 255 and 256. This differential voltage applied to primary winding 270 of coupling transformer 272 is coupled across secondary winding 274 to a resistor 80 in the signal chain.

Figure 4:
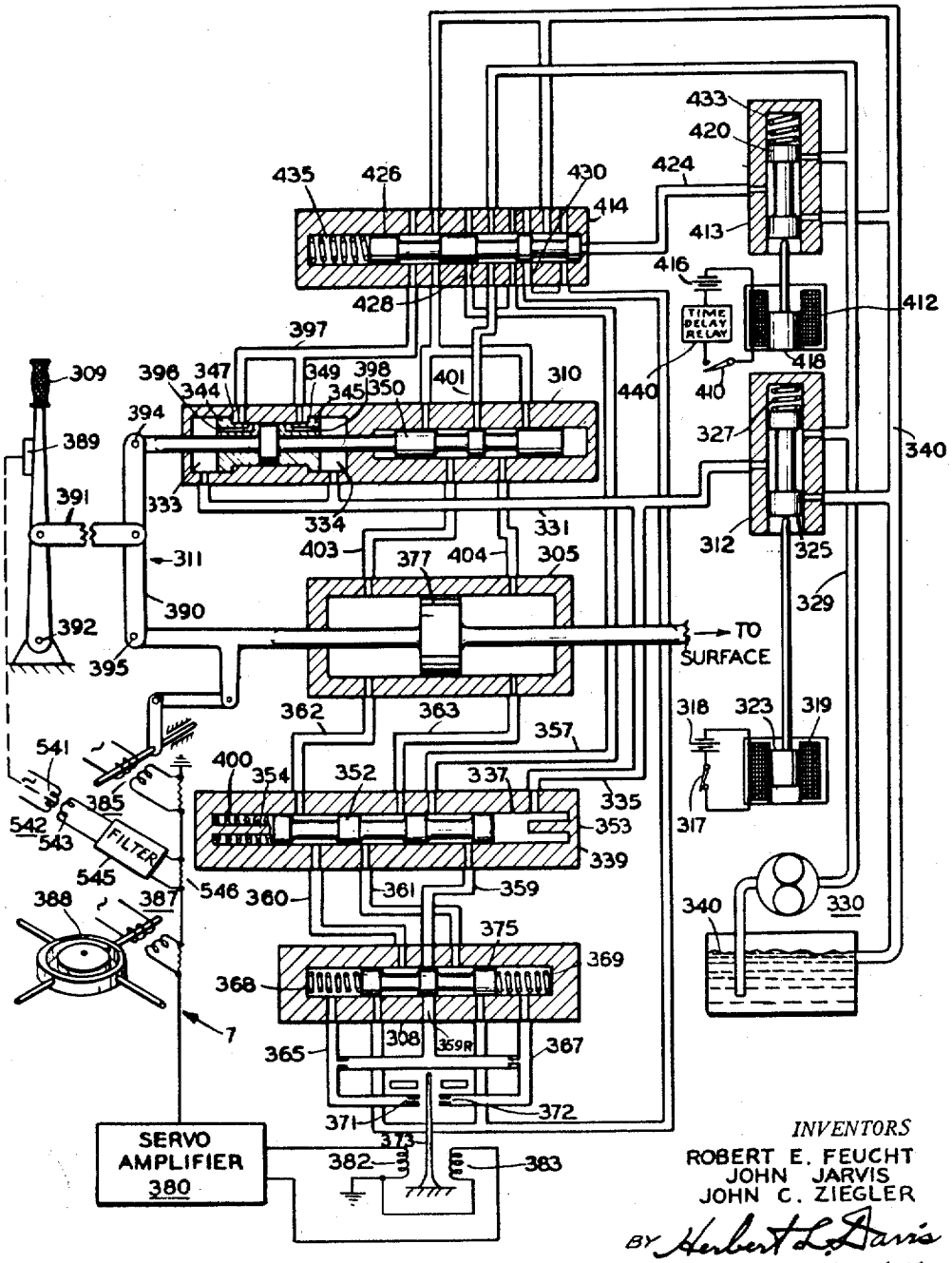
FIGURE 4 illustrates schematically the novel control system of the present invention incorporating a fluid actuated power means for operating the control surface of an aircraft.

Turning now to FIGURE 4, another embodiment is shown of an aircraft steering system wherein a hydraulic ram 305 normally displaces a control surface of the craft in response to actuations by an automatic control system signal chain on a transfer valve 308. The automatic control system, however, can be overcome by exerting a predetermined force on a manually operable stick 309; the resulting stick movements operating a holding and interlock valve 310 through a differential linkage 311 as described in detail in copending application Serial No. 448,878 *filed August 10, 1954 for Parallel Hydraulic Control System by Jack Brandstadter and* assigned to the assignee of the present invention.

To place the system into operation initially, switch arm 317 is moved to a closed position; battery 318 energizes solenoid 319 and plunger 323 lifts spool 325 of valve 312 against the bias of spring 327. Thereafter, pressure fluid can flow through conduit 329 from a conventional pump system 330 through one parallel conduit 331 to chambers 333 and 334 of valve 310 and through the other parallel conduit 335 to chamber 337 of valve 339. The pressure fluid in chambers 333 and 334 moves pistons 344 and 345 against shoulders 347 and 349 to center and relatively fix spool 350; provided solenoid 412 has been operated so that spool 426 has been moved to the left. After an interval of time, time delay device 440 will permit the spool 426 to return to the position shown. The pressure fluid moves spool 352 from a position against stop 353 to a position against stop 354, thereby allowing pressure fluid to flow from conduit 357 through conduit 359 to transfer valve 308 and to flow from transfer valve 308 through either conduit 360 or 361 and conduit 362 or 363 to ram 305.

In transfer valve 308, the pressure fluid flows through conduit 359 and the annular aperture 359R to conduits 365 and 367 to chambers 368 and 369 and through orifices 371 and 372 to sump 340. The flow is equal when a cantilevered armature 373 is centered, and the equal pressures permit spool 375 to remain in a center position. The flow through one of these orifices is restricted when the armature is moved to the right or left of center, and the resulting differential pressure in chambers 368 and 369 forces spool 375 to move to the right or left. Depending upon the direction of this movement, the pressure fluid from conduit 359 is conducted through a conduit 360 or 361 and a corresponding conduit 362 or 363 to one side of piston 377 in ram 105. Thus, the direction and amount of movement of armature 373 controls the movement of piston 377. The armature is moved by a pair of coils 382 and 383 which surround the armature and are differentially energized in a direction and in an amount corresponding to the phase and amplitude, respectively, of the signal applied to amplifier 380 from the signal chain of the automatic pilot system.

Conventional automatic pilot systems control an aircraft about its three axes of control. For purposes of simplicity, however, the control system is illustrated as involving only the elevator channel and as comprising a follow-up inductive device 385, a pitch attitude inductive device 387, and a force sensing device 389. Inductive device 387 and the pitch axis gimbal of a vertical gyroscope 388 are connected in a well known manner for relative displacement of its rotor and stator as the craft is displaced from a predetermined pitch attitude to develop a corresponding signal. This signal, applied to amplifier 380, operates transfer valve 308 to actuate hydraulic ram 305. When the control surface has been moved to such an extent that the signal resulting from the relative displacement of the rotor and stator of inductive device 385 becomes equal and opposite to the signal from inductive device 387, the net input signal to amplifier 380 is zero; armature 373 is centered; and displacement of the surface is stopped.

Ram 305 through differential linkage 311 also displaces manual controller 309. In this linkage, link 390 is pivotally connected by link 391 to the manual controller 309 which is pivotally connected to the airframe by pin 392. Pistons 344 and 345 center spool 350 to relatively fix pin 394. Thus, the movement of piston 377 rotates link 390 about pin 394, and link 391 constrains controller 309 to follow the action of the surface.

During the operation of the craft by the automatic control system, the human pilot can, by exertion of a force exceeding a predetermined amount, overpower the automatic system and control the surface manually. Link 390 is pivoted about pin 395 in a direction dependent upon the direction the human pilot moves controller 309. Displacing spool 350 from its center releases the pressure either in chamber 333 or in chamber 334 through either conduits 396 and 397 or conduits 398 and 397 through valve body 414 to sump line 340. This also releases the pressure in leads 331 and 335, and spring 400 drives spool 352 against abutment 353 to cut off the operation of transfer valve 308 so that the automatic control system cannot oppose the manual operation. Moving spool 350 thereafter permits pressure fluid from conduit 401 to feed selectively conduits 403 and 404 on either side of piston 377. Thus, by momentarily applying a sufficient force to controller 309 to overpower the pressure exerted on locking pistons 344 and 345 by the pressure fluid in chambers 333 and 334, the human pilot relieves the fluid pressure opposing him and renders the automatically controlled transfer valve 308 ineffective on ram 377. Pistons 344 and 345 remain in their displaced position since the fluid pressure from conduits 331 and 335 is bled by conduits 396 and 398 to conduit 397 and conduit 340 to sump.

During the course of manual operation of the craft, the human pilot has no way of knowing whether or not the automatic control system is properly functioning. Should the automatic control system not be functioning properly when the change-over is made from manual to automatic control, the control surface may be moved so rapidly as to place the craft in a dangerous attitude before the human pilot can regain control of the craft. So as to reengage the automatic control system with limited authority, switch arm 410 is moved to a closed circuit position, thereby permitting battery 416 to energize solenoid 412 whose plunger 418 then lifts spool 420 of valve 413 against the bias of spring 433. Line pressure applied from conduit 329 through conduit 424 to the right end of spool 426 moves the spool to the left so that its ends permit pressure fluid to flow from conduit 329 to conduit 357; the action of orifice 428 of valve 414, however, restricts the flow of pressure fluid, and the action of orifice 430 restricts the flow to sump. Thus, the operation by transfer valve 308 and ram 305 is slowed. Spool 426 remains in a position displaced to the left as long as solenoid 412 is energized; and a conventional time delay switch 440 is provided to deenergize solenoid 412 after a predetermined period of time so that spring 433 can return spool 420 to the position shown, thereby releasing the pressure in conduit 424 to sump line 340 and spring 435 returns spool 426 to the normal position shown. Full line pressure thereafter is supplied to transfer valve 308 and ram 305, and the automatic control system is again operating at full power.

In accordance with the present invention, forces exerted on stick 309 which are less than the force required to overcome the locking action of pistons 344 and 345 will displace the rotor 541 of an inductive device 542 relative to stator 543 to develop a corresponding signal which is fed through a low pass filter 545 so that only sustained signal effects are applied across resistor 546.

When the human pilot applies to stick 309 a force less than that required to overpower the automatic control signal, this force correspondingly displaces rotor 541 relative to stator 543 to develop a signal which, if sustained longer than the time constants of filter 545, is applied across resistor 546. The signal is transmitted to amplifier 380 and actuates armature 373 until piston 377 has moved the surface and, also, the rotor of inductive device 385 to develop a signal to equal and oppose the signal from inductive device 542. At the same time, the movement of linkage 311 displaces link 391 to move stick 309 to relieve the force. The displaced surface, however, places the craft in a pitch attitude such that the output of inductive device 387 balances the output of inductive device 385. Thus, stick 309 can be displaced to trim the craft or be displaced with constant force to provide a constantly increasing amount of control surface displacement.

The control channel for the aileron channel may be identical to the foregoing with the exception that the attitude signal developing inductive device will be mounted on the vertical gyroscope to give a bank attitude signal and the inductive device, such as 542, will be actuated in response to lateral forces on stick 309.

Although one one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. In a system for controlling the movement of a craft surface, a resilient longitudinally extending control member, means for manually exerting an effort at one end thereof to move said member, means for transmitting said effort to said surface for moving the latter, power means for exerting an effort on said surface for moving the latter, means for limiting the maximum effort exerted by said power means on said surface whereby said surface may be moved by the effort exerted manually on said resilient member upon overriding the effort exerted by said power means, automatic control means responsive to deviations of said craft from a predetermined reference for developing signals for operating said power means, means to modify the signals developed by said automatic control means including a pair of elements carried by said resilient member and movable relative one to the other upon a deflection of the one end of said resilient member relative to another end thereof, and control means operatively connected to said elements and responsive to the manual effort on said member for developing corresponding signals for operating said power means, whereby said power means may be operated manually by exerting on said resilient member an effect less than that required to override the effort exerted by said power means on said surface.

2. In a steering system for a craft, a resilient control column, manually operable means for exerting an effort on said column at one end to deflect said column relative to an opposite end thereof, whereby spaced portions of said column are deflected, a pair of members spaced along said column, an inductive signal developing device mounted on one of said members, said device having a stator and a rotor movable about an axis relative thereto, a bracket operatively connected to said rotor and having a portion eccentric to the axis thereof, motion transmitting means on said other member engageable with said portion so that relative movement of said members due to said deflection effects an adjustment of said rotor relative to said stator to develop an electrical signal, and power means operable by said signal for controlling said craft.

3. An automatic control system comprising power means for exerting an effort on a control surface for moving the latter, automatic control means for providing signals for operating said power means, a resilient member, manually operable means for exerting an effort on said member, first control means operably connecting said member to said power means and effective upon exertion of a biasing force on said resilient member in excess of a predetermined range for rendering said automatic control means ineffective to control said power means and said member effective to control said power means, and second control means responsive to a deflection of one end of said resilient member relative to another end and operable upon the application to said member of a biasing force at said one end within said predetermined range, means operably connecting said second control means to said automatic control means for providing a signal corresponding to said last-mentioned biasing force for modifying the action of said automatic control means to control said power means.

4. In a steering system, a resilient control column, manually operable means for exerting an effort on said column to effect a longitudinal deflection of said column, said control column including a pair of relatively displaceable members projecting from said column and spaced longitudinally thereon, one of the spaced members of said column being displaced relative to the other of said members upon the longitudinal deflection of said column by said manually operable means, a two part signal devleoping device having one of said parts fixedly mounted on one of said projecting members and the other part movable relative to said first-mentioned part, motion transmitting means operatively connecting said other projecting member to the other part of the signal developing device and movably responsive to the relative displacement of said spaced members for causing said device to develop a corresponding signal.

5. In a steering system, a resilient control column, manually operable means for exerting a biasing force at one portion of said column to effect a longitudinal deflection of said column, said column including a pair of members projecting from said column and spaced longitudinally on said column, one of said members being movable relative to said other member upon the longitudinal deflection of said resilient column by the manually operable means, a two part signal developing device mounted on the other of said members and having one part fixed with said other member and the other part movable relative thereto, and means for operatively connecting said one member and said other part including a bracket operatively connected to said other part, motion transmitting means on said one member and engageable with said bracket in such a manner that relative movement of said members caused by the longitudinal deflection of said control column moves said other part relative to said one part to cause said signal generator to develop a corresponding signal.

6. In a steering system for a craft, a resilient control column, manually operable means for exerting a biasing force at one portion of said column to effect a longitudinal deflection of said column, said column including a pair of members projecting from said column and spaced along said column, one of said members being movable relative to said other member upon the longitudinal deflection of said column by said manually operable means, a two part electric signal generator mounted on the other of said members and having one part fixed with said other member and the other part movable relative thereto, means for operatively connecting said one member and said other part including a bracket operatively connected to said other part, motion transmitting means on said one member and engageable with said bracket in such a manner that relative movement of said members caused by the longitudinal deflection of said control column moves said other part relative to said one part to cause said signal generator to develop an electrical signal and power means operable by said signal for controlling said craft.

*7. The combination comprising a resilient control column, manually operable means for exerting an effort on said column to effect a longitudinal deflection of said column, due to bending moments set up in the column upon said effort being exerted on said column, said control column including a pair of relatively displaceable members, one of the members of said column being displaced relative to the other of said members upon the longitudinal deflection of said column due to said bending moments set up in said column by said manually operable means, a two part signal developing device having one of said parts fixedly mounted on one of said members and the other part movable relative to said first-mentioned part, means operatively connecting said other member to the other part of the signal developing device and movably responsive to the relative displacement of said members due to said bending moments set up in said column for causing said device to develop a corresponding signal.*

*8. A stick force transducer comprising a control stick mounted for universal movement in response to applied forces, said control stick having a flexible portion adapted to bend in predetermined correspondence to forces applied thereto, and means for detecting both the direction and magnitude of a force applied to said flexible portion, said latter means including electrical means for indicating said direction and magnitude as an electrical response.*

*9. A stick force transducer as set forth in claim 8 wherein the means for detecting the direction and magnitude of an applied force comprises means for detecting the extent of bending of the flexible stick portion in each of two mutually perpendicular directions and for presenting such intelligence as individual electrical responses.*

References Cited in the file of this patent or the original patent

UNITED STATES PATENTS

| | | |
|---|---|---|
| 2,451,263 | Webb | Oct. 12, 1948 |
| 2,626,115 | Atwood et al. | Jan. 20, 1953 |

OTHER REFERENCES

Aircraft Engineering, January 1952, page 5.

Instrument Practice, January 1955, pages 56 and 65.